(12) United States Patent
Towler et al.

(10) Patent No.: US 6,222,672 B1
(45) Date of Patent: *Apr. 24, 2001

(54) IMAGING SYSTEMS

(75) Inventors: Michael John Towler, Botley; Harry Garth Walton, Cowley; Elizabeth Jane Acosta, Botley, all of (GB)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,295

(22) Filed: Nov. 24, 1998

(30) Foreign Application Priority Data

Nov. 26, 1997 (GB) ................................................... 9725094

(51) Int. Cl.⁷ ........................... G02B 27/26; G02B 27/22; G02B 27/28; H04N 13/04
(52) U.S. Cl. .......................... 359/465; 359/464; 359/497; 359/495; 348/57; 348/58; 349/15
(58) Field of Search .................................... 359/464, 465, 359/462, 495, 497; 348/57, 58; 349/15

(56) References Cited

U.S. PATENT DOCUMENTS

| | | | |
|---|---|---|---|
| 4,719,507 | * 1/1988 | Bos | 359/464 |
| 4,870,486 | * 9/1989 | Nakagawa et al. | 358/92 |
| 4,884,876 | 12/1989 | Lipton et al. | |
| 5,686,975 | 11/1997 | Lipton | |
| 5,886,816 | * 3/1999 | Faris | 359/465 |

FOREIGN PATENT DOCUMENTS

| | | |
|---|---|---|
| 0477882 | 9/1991 | (EP). |
| 0664495 | 1/1995 | (EP). |
| 0721132 | 12/1995 | (EP). |
| 0770889 | 10/1996 | (EP). |

OTHER PUBLICATIONS

European Search Report dated Dec. 20, 1999 for Patent No. 98309640.5–2217.

* cited by examiner

*Primary Examiner*—Audrey Chang
(74) *Attorney, Agent, or Firm*—Renner, Otto, Boisselle & Sklar

(57) ABSTRACT

An imaging system according to the invention includes: a matrix of light modulating elements including first and second elements for respectively transmitting first and second image components; a polarizing element having a first polarization axis for linearly polarizing light from the first and second elements; a first optical retardation element incorporating at least one first retarder having first and second regions respectively having a first optic axis at a first orientation and a second option axis at a second orientation to the first polarization axis; and a detecting element having first and second detecting parts, each detecting part including respective second optical retardation element incorporating at least one second retarder and an analyzing element having a second polarization axis intended to be disposed at a defined orientation relative to the first polarization axis, at least one second retarder of the first detecting part having an optic axis which is intended to be disposed substantially perpendicularly to the first optic axis and transversely to the second optic axis of the at least one first retarder, and at least one second retarder of the second detecting part having an optic axis which is intended to be disposed substantially perpendicularly to the second optic axis and transversely to the first optic axis of the at least one first retarder. Substantially only light relating to the first image component is transmitted by the first detecting part and substantially only light relating to the second image component is transmitted by the second detecting part.

19 Claims, 14 Drawing Sheets

IMAGING SYSTEMS

TECHNICAL FIELD OF THE INVENTION

This invention relates to imaging systems and is more particularly, but not exclusively, concerned with stereoscopic display systems of the type comprising a pixelated display device, such as liquid crystal display device for example, and a complementary viewing device for positioning immediately in front of a viewer's eyes to enable a stereoscopic image displayed by the display device to be viewed.

BACKGROUND OF THE INVENTION

FIG. 1 diagrammatically illustrates a known stereoscopic display system comprising a stereoscopic display device in association with a complementary viewing device in the form of spectacles comprising two orthogonal polarisers intended to be disposed so that each polariser is positioned immediately in front of a respective eye of the viewer. The stereoscopic display device comprises a matrix of pixels half of which emit light polarised in a first direction and the other half of which emit light polarised in a second direction orthogonal to the first direction. For example the pixels may be arranged in columns and rows in the matrix, and alternate pixels or alternate rows or columns of pixels may be of the two different polarisation types. Thus the two eyes of the user see different images determined by switching of the pixels of the two polarisation types, and in this manner the viewer perceives a three dimensional scene. Ideally light pertaining to only one of the different images should be incident on each eye of the user over as broad a range of wavelengths as possible if the three-dimensional image is to be of the best quality.

Referring to FIG. 1, such a known stereoscopic display device may comprise a layer of liquid crystal material 1 confined between two transparent electrodes 2 and 3 one of which is shown divided into two regions A and B denoting two pixels of the device. Furthermore the electrodes 2 and 3 and liquid crystal material 1 confined therebetween are disposed between two linear polarisers 4 and 5 having polarising axes whose relative orientation is determined by the mode of switching of the liquid crystal material in the device. For example, the polarising axes of the polarisers are normally aligned perpendicular to one another in a twisted nematic liquid crystal display (TNLCD) device. As is well known, the liquid crystal material of the device acts as a pixelated optical shutter enabling the emission of light to be controlled on a pixel-by-pixel basis, and accordingly it is not necessary to describe the switching operation of such a device in detail.

In the particular arrangement which is diagrammatically shown in FIG. 1 the polariser 5, which is positioned in front of the liquid crystal material 1 and associated electrodes 2, 3, has its polarisation axis 11 disposed vertically. Furthermore an optical retarder in the form of a quarter wave plate 6 is positioned in front of the polariser 5 and comprises two differently patterned regions A' and B' having optic axes 12 and 13 oriented respectively at −45° and +45° to the polarisation axis of the polariser 5. Thus light transmitted by the pixel A emerges from the region A' of the quarter wave plate 6 circularly polarised in a right-handed direction, as shown by the arrow 7, and light transmitted by the pixel B emerges from the region B' of the quarter wave plate 6 circularly polarised in a left-handed direction, as indicated by the arrow 8.

In order to view a stereoscopic image, it is necessary to ensure that the viewer's left eye is only aware of light transmitted by pixels of one type, such as the pixel A, whilst being permanently unaware of the state of pixels of the other type, such as the pixel B, whereas the viewer's right eye is only aware of light transmitted by pixels of the other type, such as the pixel B, whilst being permanently unaware of the state of pixels of the one type, such as the pixel A. To this end, viewing spectacles with different polarising arrangements are placed immediately in front of the viewer's eyes, only the arrangement in front of the viewer's right eye 14 being shown in FIG. 1 for the purpose of illustration.

In this case the arrangement comprises an optical retarder in the form of a quarter wave plate 9 having its optical axis 15 parallel to the optic axis 13 of the region B' of the quarter wave plate 6, and a polariser 10 having its polarisation axis 16 orientated at 90° to the polarisation axis 11 of the polariser 5. Thus the region B' of the quarter wave plate 6 and the quarter wave plate 9 having parallel optic axis 13 and 15 behave as a half wave plate with its optic axis orientated at +45° to the polarisation axis 11 and disposed between the crossed polarisers 5 and 10, thus allowing the transmission of light from the pixel B to the viewer's right eye 14. On the other hand, since the region A' of the quarter wave plate 6 and the quarter wave plate 9 have crossed optic axis and are disposed between the crossed polarisers 5 and 10, light transmitted from the pixel A is cancelled almost completely at all wavelengths (assuming the quarter wave plates 6 and 9 are made of the same material so that they have the same dispersion characteristics) so that substantially no light reaches the viewer's right eye 14 from the pixel A. Such fully achromatic behaviour due to summing of the effect of optical retarders to zero retardation is known, for example, from U.S. Pat. No. 4,719,507.

Although not specifically shown in FIG. 1, it will be appreciated that the converse arrangement associated with the user's left eye comprises a quarter wave plate having its optic axis parallel to the optic axis 12 of the region A' of the quarter wave plate 6 and a polariser having its polarisation axis at 90° to the polarisation axis 11 of the polariser 5. In this case such a quarter wave plate and the region A' of the quarter wave plate 6 having parallel optic axes behave as a half wave plate with its optic axis at −45° between the crossed polarisers, and thus light transmitted from the pixel A reaches the viewer's left eye, whereas the crossed optic axes of the quarter wave plate and the region B' of the quarter wave plate 6 ensures that substantially no light from the pixel B reaches the viewer's left eye.

However the two sequential quarter wave plates which form a half wave retarder (unlike a zero wave retarder) only act in the required manner at a single wavelength, so that their transmission properties between crossed polarisers are chromatic, rather than achromatic. This can be seen from the graph of FIG. 2 showing the transmission level as a function of wavelength for the light received by the viewer's right eye 14 from the region B', after passing through the analysing polariser 10, and from the region A' of the quarter wave plate 6. Whilst the light from the region A' is cancelled substantially completely at all wavelengths, the light from the region B', after passing through the analysing polariser 10, is substantially unattenuated at only one wavelength (about 525 nm) whereas the light at over wavelengths is attenuated to a lesser or greater extent. Of course, the light received by the viewer's left eye will have a similar transmission profile but with A' substituted for B' and B' substituted for A' in FIG. 2.

Instead of having an achromatic dark state and a chromatic bright state as in the case of the graph of FIG. 2, it is possible for the device to be adapted to have a chromatic dark state and an achromatic bright state by providing a polariser 10 with a polarisation axis parallel to the polarisation axis 11 of the polariser 5. FIG. 3 is a graph of the transmission profile of the light received from the regions A' and B' of the quarter wave plate 6 by the viewer's right eye showing, as expected, the wavelength dependence of the light received from the region B'. Again the transmission profile of the light received by the viewer's left eye is similar with A' substituted for B' and B' substituted for A' in FIG. 3.

FIG. 4 shows a graph illustrating the light levels received from the regions A' and B' of the quarter wave plate 6 by the viewer's right eye, but with polycarbonate retarders being used to form a quarter wave plate 9 in each part of the viewing spectacles. Such polycarbonate retarders are more conventional, and thus less costly, for such use. The performance of the system is not greatly compromised by the use of polycarbonate retarders.

S. Pancharatnam "Achromatic Combinations of Birefringent Plates" Proceedings of Indian Academy of Sciences Vol. XLI, no. 4, Sec. A, 1955, pp. 130–136 and pp. 137–144 discuss the use of stacked uniform retarder films to improve achromaticity. However these papers are not specifically concerned with stereoscopic imaging systems.

SUMMARY OF THE INVENTION

It is an object of the invention to provide an imaging system having an improved achromatic bandwidth.

According to the present invention, there is provided an imaging system comprising a matrix of light modulating elements comprising first elements for transmitting a first image component and second elements for transmitting a second image component, polarising means having a first polarisation axis for linearly polarising light from the first and second elements, first optical retardation means incorporating at least one first retarder having first regions having a first optical axis at a first orientation to the first polarisation axis and second regions having a second optic axis at a second orientation to the first polarisation axis, whereby light from the first element is polarised by the first regions and light from the second element is polarised by the second regions orthogonally to the light polarised by the first regions, and detecting means having first and second detecting parts, each detecting part comprising respective second optical retardation means incorporating at least one second retarder and analysing means having a second polarisation axis intended to be disposed at a defined orientation relative to the first polarisation axis, at least one second retarder of the first detecting part having an optic axis which is intended to be disposed substantially perpendicularly to the first optic axis and transversely to the second optic axis of said at least one first retarder, and at least one second retarder of the second detecting part having an optic axis which is intended to be disposed substantially perpendicularly to the second optic axis and transversely to the first optic axis of said at least one first retarder, whereby substantially only light relating to the first image component is transmitted by the first detecting part and substantially only light relating to the second image component is transmitted by the second detecting part.

Such an imaging system is particularly applicable to a stereoscopic imaging system in which the first and second detecting parts are constituted by left eye and right eye viewing parts of viewing means by means of which a viewer may view a stereoscopic image. Because the optic axis of the second retarder of each viewing part is disposed substantially perpendicularly to a respective one of the first and second optic axis as well as transversely to the other of the first and second optic axes, each of the viewer's eyes will receive substantially only light from a respective one of the first and second image components, the light from the other image component being substantially cancelled. Such a system is therefore capable of providing a substantial improvement in achromaticity as compared with a conventional stereoscopic display system utilising similar material for the retarders.

However it is important to appreciate that the imaging system of the invention has application in systems other than stereoscopic display systems. For example the system may be applied to a system in which each of the two achromatic channels is applied to a respective detector or viewer for detecting or viewing the first and second image components separately (rather than as two parts of stereoscopic image). Furthermore the system may be applied to a projection system in which a stereoscopic image is projected on to a suitable receiving surface and is viewed by the viewer through the left eye and right eye viewing parts of the viewing means.

Preferably the first optical retardation means is adapted to linearly polarise light from the first element in a first direction and to linearly polarise light from the second elements in a second direction transverse to the first direction. Alternatively the first optical retardation means may be adapted to circularly polarise light from the associated elements. It will be understood that, in either case, each of the retardation means may comprise more than one retarder which sum to produce the required linear or circular polarisation.

It will be understood that the required orthogonal relationship between the polarised light from the first elements and the polarised light from the second elements can be satisfied whether the light is linearly polarised or circularly polarised.

Furthermore the at least one first retarder may comprise a half wave plate incorporating first and second regions having optic axes which are orientated at equal but opposite angles to the first polarisation axis. For example, the optic axes of the first and second regions of the half wave plate may be orientated at about –22.5° and about +22.5° to the first polarisation axis.

Furthermore the at least one second retarder may comprise a half wave plate, the two half wave plates of the first and second detecting parts having optic axes which are oriented at equal but opposite angles to the first polarisation axis. For example, the optic axes of the half wave plates of the first and second detecting parts may be oriented at about –67.5° and about +67.5° to the first polarisation axis.

In a system in which the detecting means is tiltable relative to the first optical retardation means, third optical retardation means are advantageously provided for circularly polarising the light from the first and second regions of the first optical retardation means, and respective fourth optical retardation means associated with each of the detecting parts are provided for linearly polarising the circularly polarised light from the third optical retardation means for input into the second optical retardation means of the detecting part. For example, the third optical retardation means may comprise a quarter wave plate having an optic axis oriented at about 90° to the first polarisation axis. Also the respective fourth optical retardation means of each of the detecting parts may comprise a quarter wave plate having a optic axis which is substantially parallel to the first polarisation axis.

Alternatively the third optical retardation means may comprise a quarter wave plate incorporating first regions having an optic axis at a first orientation to the first polarisation axis and second regions having an optic axis at a second orientation to the first polarisation axis such that light from the first elements is circularly polarised in one direction and light from the second elements is circularly polarised in the opposite direction.

The invention further provides a detection system for detecting polarised light polarised by a first retarder part having a first optic axis at a first orientation and polarised light, orthogonal to the light polarised by the first retarder, polarised by a second retarder part having a second optic axis at a second orientation, the detection system having first and second detecting parts each of which comprises respective optical retardation means incorporating at least one second retarder and associated analysing means, at least one second retarder of the first detecting part having an optic axis which is intended to be disposed substantially perpendicularly to the first optic axis and transversely to the second optic axis, and at least one second retarder of the second detecting part having an optic axis which is intended to be disposed substantially perpendicularly to the second optic axis and transversely to the first optic axis, whereby substantially only light relating to a first image component is transmitted by the first detecting part and substantially only light relating to a second image component is transmitted by the second detecting part.

The invention further provides a method of obtaining a stereoscopic image by combing a matrix of light modulating elements with detecting means having first and second detecting parts, wherein the matrix of light modulating elements comprising first elements which transmit a first image component and second elements which transmit a second image component, there being associated with the matrix polarising means having a first polarisation axis which linearly polarises light from the first and second elements, and first optical retardation means incorporating at least one first retarder having first regions having a first optic axis at a first orientation to the first polarisation axis and second regions having a second optic axis at a second orientation to the first polarisation axis, whereby light from the first elements is polarised by the first regions and light from the second elements is polarised by the second regions orthogonally to the light polarised by the first regions; and each detecting part of the detecting means comprises respective second optical retardation means incorporating at least one second retarder and analysing means having a second polarisation axis at a defined orientation relative to the first polarisation axis, at least one second retarder of the first detecting part having an optic axis which is substantially perpendicular to the first optic axis and transverse to the second optic axis of said at least one first retarder, and at least one second retarder of the second detecting part having an optic axis which is substantially perpendicular to the second optic axis and transverse to the first optic axis of said at least one first retarder, whereby substantially one light relating to the first image component is transmitted by the first detecting part and substantially only light relating to the second image component is transmitted by the second detecting part.

BRIEF DESCRIPTION OF THE DRAWINGS

In order that the invention may be more fully understood, several stereoscopic display systems in accordance with the invention will now be described, by way of example, with reference to the accompanying drawings, in which.

DETAILED DESCRIPTION OF THE INVENTION

In each of the stereoscopic display systems in accordance with the invention to be described below, the optical retardation elements are chosen such that the element of the display device and the elements of the viewing spectacles combine to produce a superior achromatic bandwidth as compared with the bandwidth obtainable using simple quarter wave plates as in the system of FIG. 1, using the same birefringement material for the optical retardation elements in both systems. It is important to appreciate that such improved achromaticity is dependent on the same material being used for the optical retardation elements in the two systems, since such an improvement may not be obtainable if a much inferior material; that is a highly dispersive material, is used for the optical retardation elements of the systems of the invention as compared with the material used for the quarter wave plates of the system of FIG. 1.

In the following description, the optical retardation elements are chosen to have their stated values at a wavelength of 525 nm. However it should be noted that, in practice, the birefringence of such retardation elements is a function of temperature. Thus, when selecting materials for such retardation elements, it is necessary to bear in mind the different typical operating temperatures of the display device and the viewing spectacles. In the following description it is assumed that the material of all the retardation elements is the diacrylate polymer RM257 (obtainable from Merck Limited) except where otherwise stated. Such a polymer undergoes photopolymerisation so that it can be processed by photolithography in order to produce patterned retardation elements.

Figure 1:
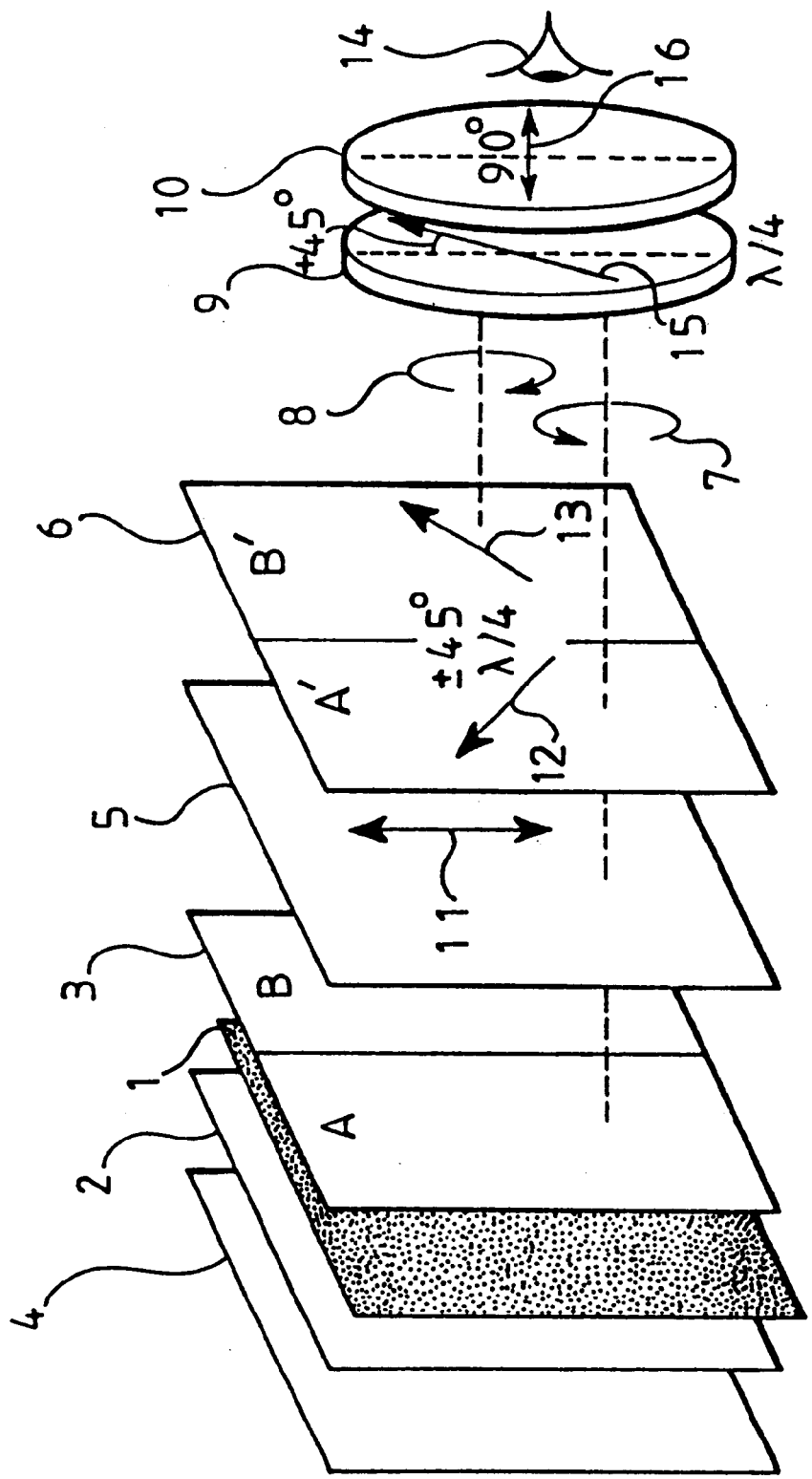
FIG. 1 diagrammatically shows a known stereoscopic display system.
Figure 5:
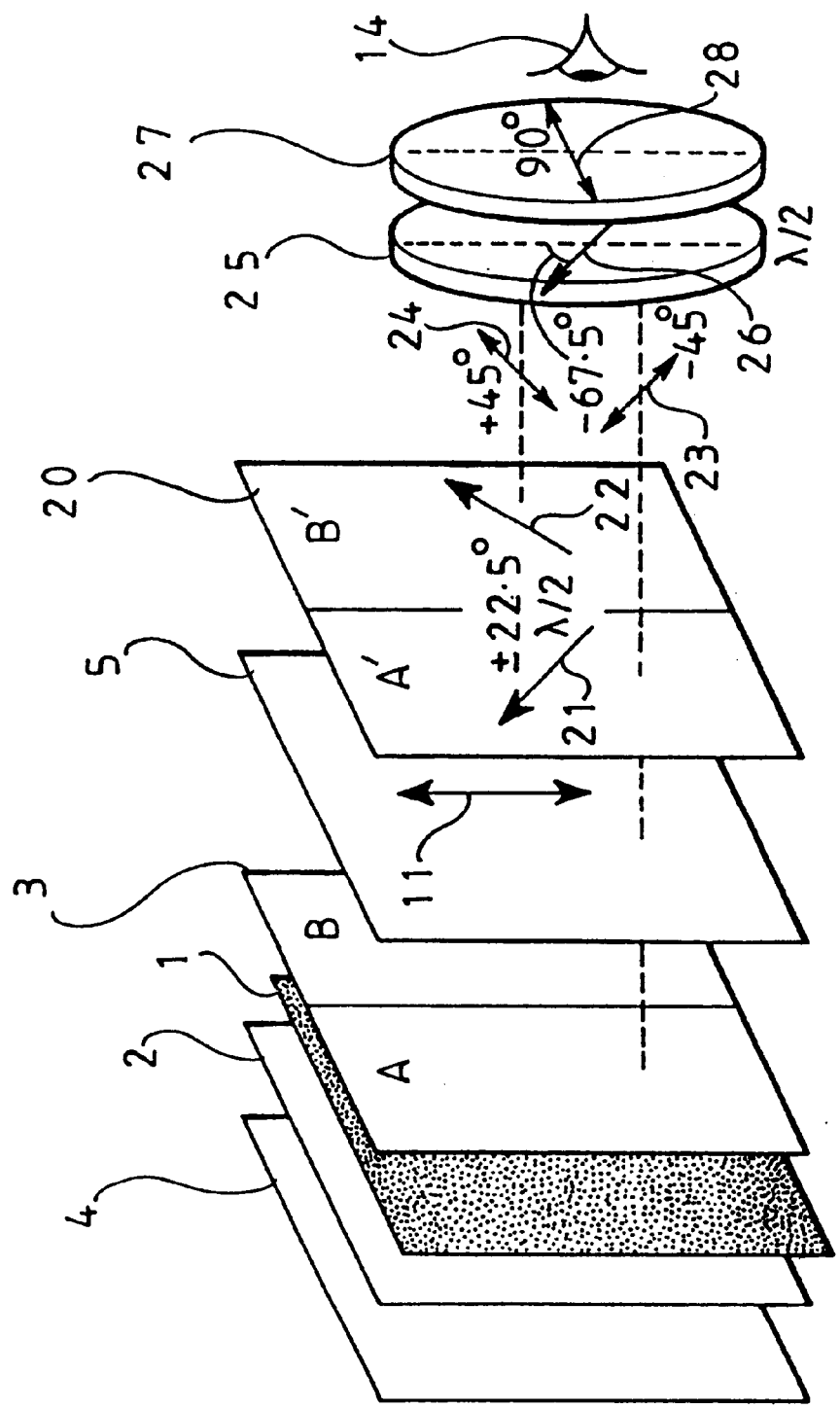
FIG. 5 diagrammatically shows a first stereoscopic display system in accordance with the invention.

The first stereoscopic display system in accordance with the invention shown diagrammatically in FIG. 5 comprises a liquid crystal optical shutter having similar liquid crystal material 1, electrodes 2, 3 and polarisers 4, 5 as shown in FIG. 1, and accordingly the same reference numerals are used in FIG. 5 to denote these elements. However, in place of the quarter wave plate 6 of FIG. 1, a patterned half wave plate 20 is used comprising a region A' having an optic axis 21 orientated at −22.5° to the polarisation axis 11 of the polariser 5 and a region B' having an optic axis 22 orientated at an angle +22.5° to the polarisation axis 11 of the polariser 5. Thus light transmitted by the pixel A emerges from the region A' of the half wave plate 20 linearly polarised at −45° to the polarisation axis 11 of the polariser 5, as shown by the arrow 23, and light transmitted by the pixel B emerges from the region B' of the half wave plate 20 linearly polarised at +45° to the polarisation axis 11 of the polariser 5, as indicated by the arrow 24. Again for the purposes of illustration, only the viewing arrangement associated with the user's right eye 14 is shown in FIG. 5, this arrangement comprising a half wave plate 25 having its optic axis 26 orientated at −67.5° to the polarisation axis 11 of the polariser 5 and a polariser 27 having its polarisation axis 28 orientated at 90° to the polarisation axis 11 of the polariser 5. Of course, the corresponding viewing arrangement associated with the viewer's left eye comprises a half wave plate having its optic axis orientated at +67.5° to the polarisation axis 11 of the polariser 5 and a further polariser having its polarisation axis orientated at 90° to the polarisation axis 11 of the polariser 5. The optic axis 26 of the half wave plate 25 associated with the viewer's right eye is therefore perpendicular to the optic axis 22 of the region B' of the half wave plate 20 and transverse to (that is not parallel to) the optic axis 21 of the region A' of the half plate 20. Further the optic axis of the half wave plate associated with the viewer's left eye is perpendicular to the optic axis 21 of the region A' and transverse to the optic axis 22 of the region B'.

Although not specifically shown in FIG. 5, it should be appreciated that, in the case of a liquid crystal display panel for example, the retarder 20 may be positioned either internally or externally of the substrate of the display panel. If positioned internally of the display panel the retarder 20 may be disposed between the liquid crystal material 1 and the electrode 3 provided that the polariser 5 is still positioned internally of the retarder 20. It will also be appreciated that a similar system in accordance with the invention may be applied to a stereoscopic projection system in which case the light emerging from the half wave plate 20 is projected on to a suitable screen and the resulting stereoscopic image is viewed through the left eye and right eye viewing arrangements. In this case the liquid crystal optical shutter may be replaced by a slide incorporating the polarisers 4, 5 and the half wave plate 20 positioned between the light source and the screen.

Figure 6:
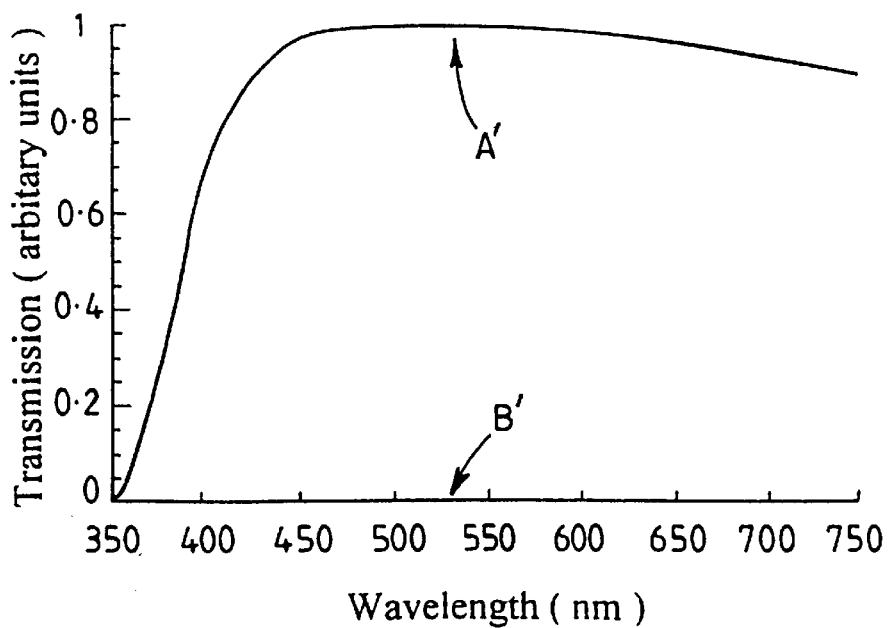
FIGS. 6 and 7 are graphs of the transmission level against wavelength of light received by one of the viewer's eyes in use of the system of FIG. 5.

FIG. 6 is a graph of the transmission level of light from the regions A' and B' of the half wave plate 20 reaching the viewer's right eye. Since the light emerging from the region B' is polarised at −45° and is therefore at an angle of 112.5° to the optic axis 26 of the half wave plate 25, such light is rotated to an angle of 2× 112.5° relative to the optic axis 26 so as to be orientated at an angle of −(67.5+112.5)=−180° to the polarisation axis 11 of the polariser 5, with the result that such light is cancelled by the polariser 27 so that substantially no light from the region B' reaches the viewer's right eye 14. Of course, this can be predicted from the fact that the optic axis 26 of the half wave plate 25 is crossed with the optic axis 22 of the region B' of the half wave plate 20. On the other hand light from the region A' polarised at +45° is at an angle of 22.5° to the optic axis 26 of the half wave plate 25 so that the light emerges from the half wave plate 25 at −(67.5+22.5)=−90° so that such light passes through the polariser 27 to the viewer's right eye 14. Similarly the half wave plate associated with the viewer's left eye has an optic axis orientated at +67.5° and a polariser having its polarisation axis at 90° to the polarisation axis 11 of the polariser 5 so that the optic axis of this half wave plate is crossed with optic axis 21 of the region A' of the half wave plate 20 with the result that light from the region A' is cancelled by the half wave plate and only light from the region B' is received at the viewer's left eye.

Figure 2:
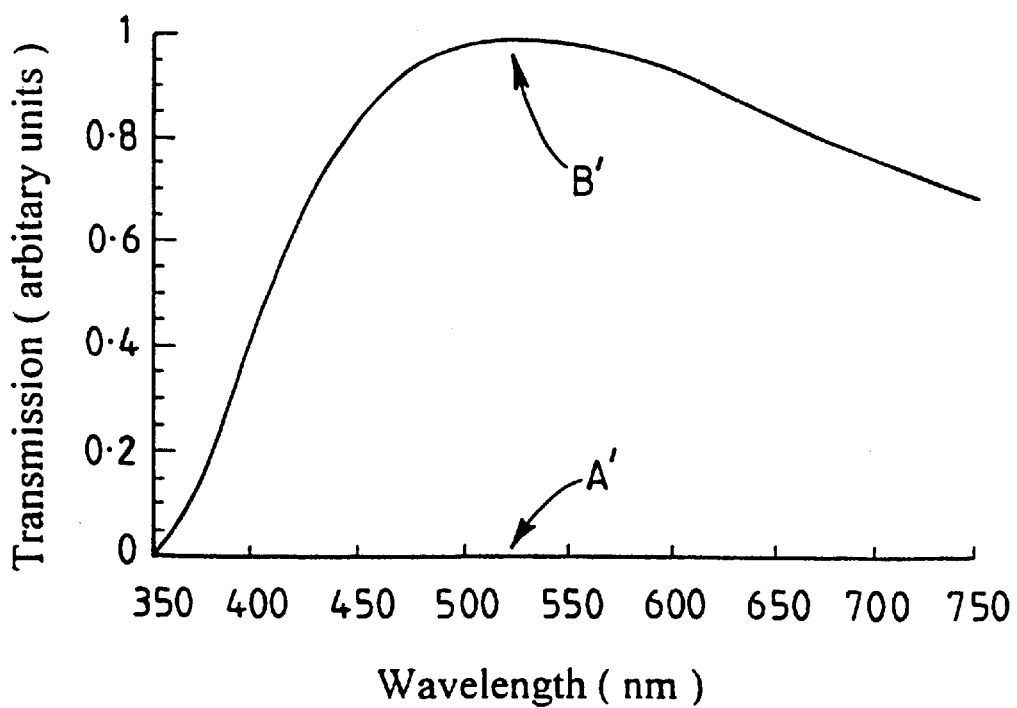
FIGS. 2, 3 and 4 are graphs of the transmission level against wavelength of light received by one of the viewer's eyes in use of the system of FIG. 1.

FIG. 6 shows the transmission level against wavelength of the light from the regions A' and B' of the half wave plate 20 received by the viewer's right eye 14, and this indicates a substantial improvement in achromaticity relative to the transmission profile of FIG. 2 obtained in use of the known system of FIG. 1. In other words, the light received at the viewer's eye is significantly less dependent on the wavelength of the light, as indicated by the much flatter transmission profile for light from the region A' in the wavelength range 450 nm to 650 nm. It should be noted that, in this case, it is the light from the region A' which is received at the viewer's right eye, rather than the light from the region B' as in FIG. 2. As before, the transmission profile of the light received at the viewer's left eye will be as shown in FIG. 6 but with B' substituted for A' and A' substituted for B'.

Figure 7:
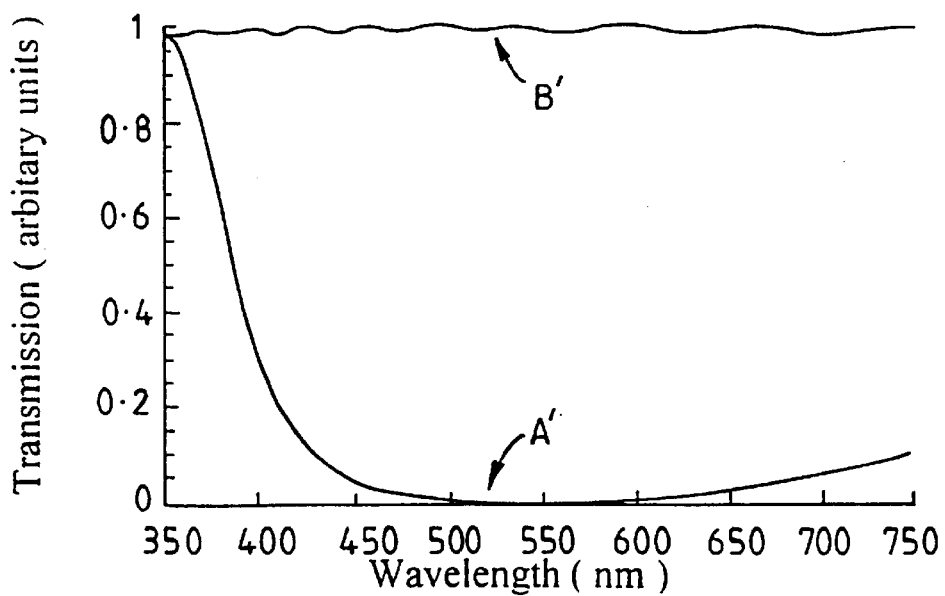

As with the known system previously described with reference to FIG. 1, such an arrangement provides an achromatic dark state and a chromatic bright state. Alternatively the system may be chosen to provide a chromatic dark state and an achromatic bright state by rotating the polariser 27 through 90° so that its polarisation axis 28 is parallel to the polarisation axis 11 of the polariser 5. The transmission profile of such an alternative arrangement is shown in FIG. 7 with, in this case, light being received at the viewer's right eye primarily from the region B' of the half wave plate 20, and light from the region A' being substantially extinguished. Again comparison of the transmission profile of FIG. 7 with transmission profile of FIG. 3 shows a substantial improvement in achromaticity.

Figure 3:
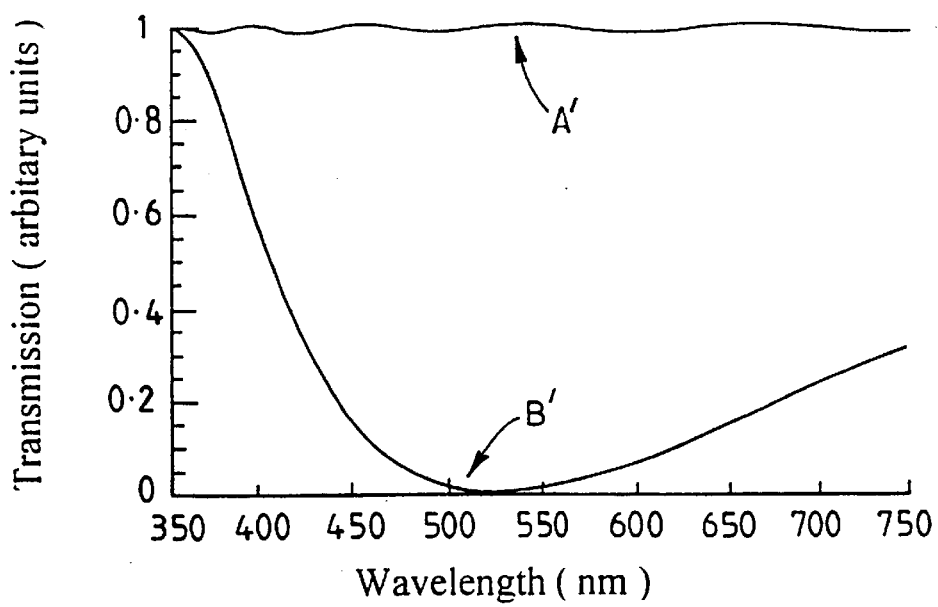
Figure 8:
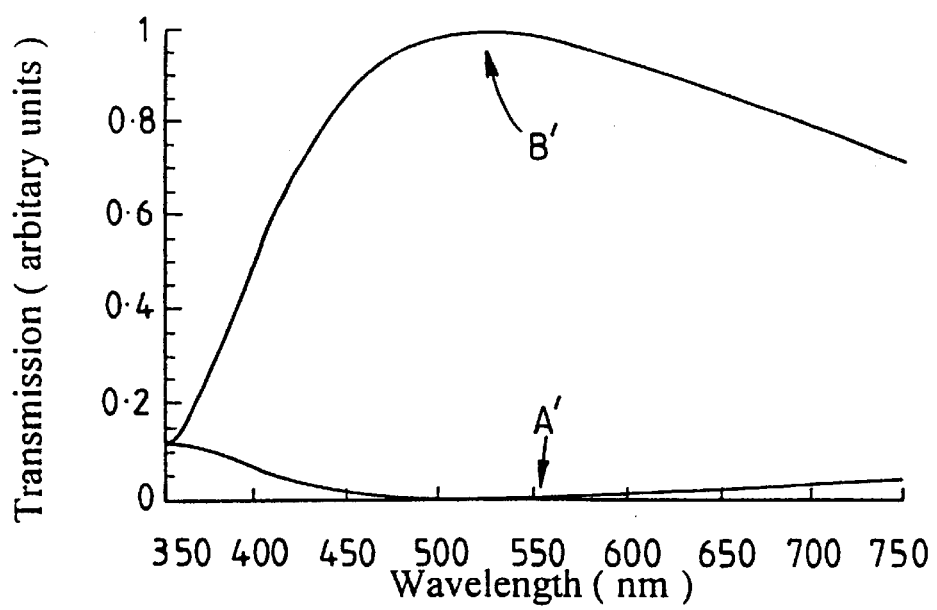
FIGS. 8 and 9 are graphs similar to the graphs of FIGS. 2 and 6 but with the viewer's head titled through 20°.

However the system of FIG. 5 suffers from one disadvantage with respect to the known system of FIG. 1 in that, in the case of the known system of FIG. 1, light emerging from the region A' and B' of the quarter wave plate 6 is circularly polarised (albeit over a restricted wavelength range) and this means that the transmission profiles of FIGS. 2 and 3 have a certain insensitivity to combined rotation of the quarter wave plate 9 and polariser 10 of the viewing spectacles, that is to tilting of the viewer's head. However this advantage is not obtained with the system of FIG. 5 because the light emerging from the regions A' and B' of the half wave plate 20 is linearly polarised, rather than circularly polarised. This is demonstrated by the graphs of FIGS. 8 and 9 which show the transmission profile of light received by the viewer's right eye with the system of FIG. 1 and with the system of FIG. 5 respectively when the viewer's head is tilted through +20° (so that, for example, the angle of the optic axis 15 of the quarter wave plate 9 is 65° and the angle of the polarisation axis 16 of the polariser 10 is 110°). Comparison of FIG. 8 with FIG. 2 shows that the transmission profile of the light received by the viewer's right eye is not greatly affected by such tilting of the viewer's head, whereas comparison of FIG. 9 with FIG. 6 shows a significant effect caused by such tilting of the viewer's head and resulting in a significant quantity of light from the region B' reaching the viewer's right eye.

Figure 10:
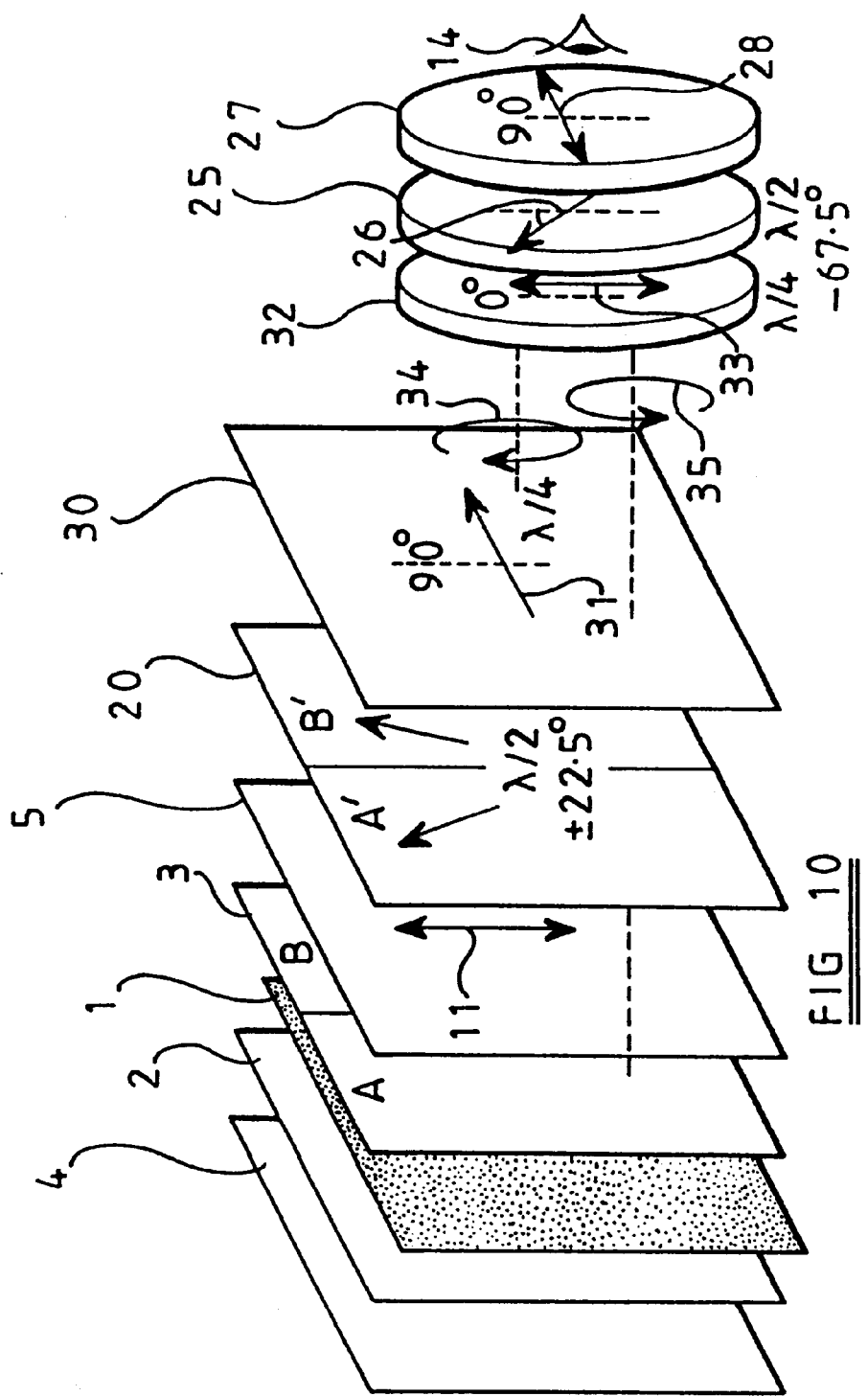
FIG. 10 diagrammatically shows a second stereoscopic display system in accordance with the invention.

In a second stereoscopic display system in accordance with the invention shown in FIG. 10, additional elements are provided both in the display device and the viewing spectacles, namely a quarter wave plate 30 in front of the half wave plate 20 having its optic axial 31 oriented at 90° relative to the polarisation axis 11 of the polariser 5, and a further quarter wave plate 32 behind the half wave plate associated with each of the viewer's eyes having its optic axis 33 parallel to the polarisation axis 11 of the polariser 5. The effect of the quarter wave plates 30 and 32 having crossed optic axes 31 and 33 is to produce circularly polarised light 34 and 35 passing between the display device and the viewing spectacles.

Figure 9:
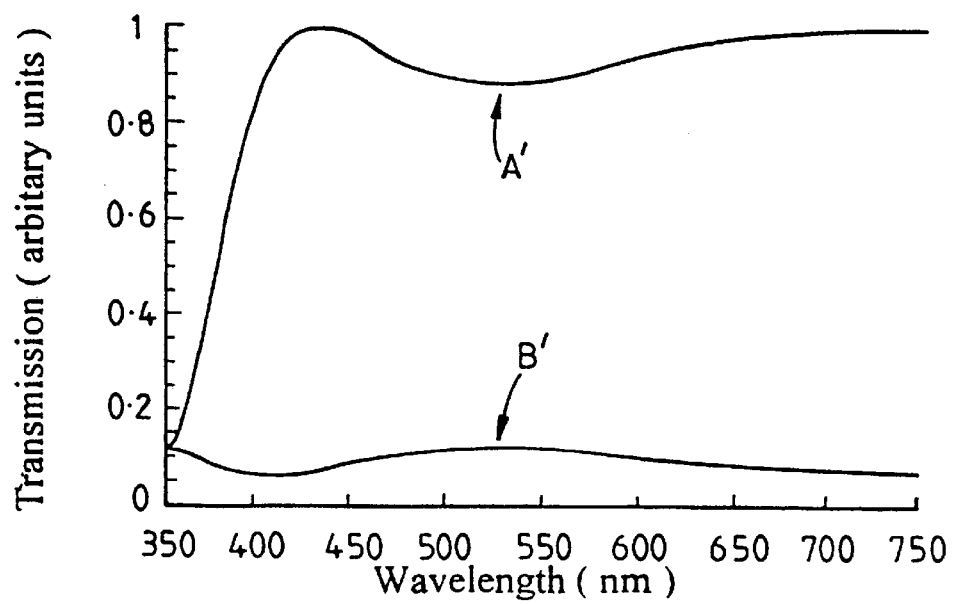
Figure 11:
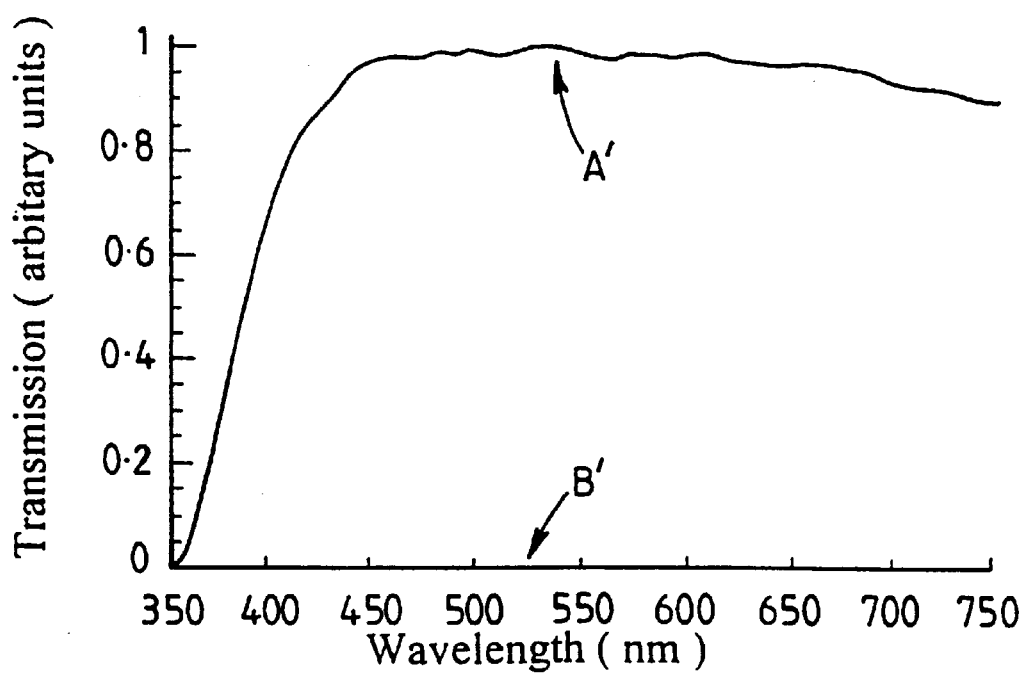
FIGS. 11, 12 and 13 are graphs of the transmission level against wavelength in use of the system of FIG. 10.
Figure 12:
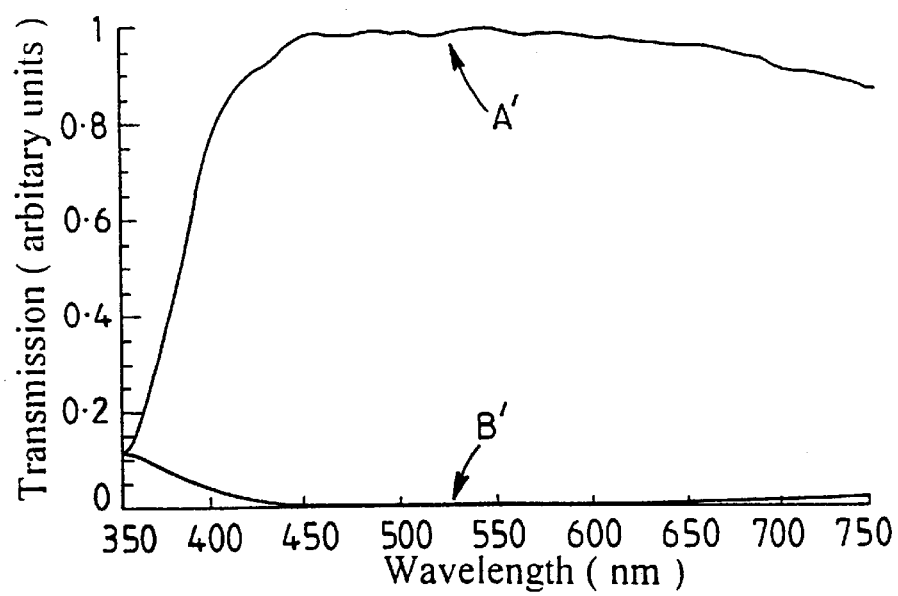

FIG. 11 shows the transmission profile of light received from the region A' of the half wave plate 20 by the viewer's right eye in use of the system of FIG. 10 showing that similar achromaticity is obtained to the transmission profile of FIG. 6 for the system of FIG. 5. Furthermore FIG. 12 shows the transmission profile of light received at the viewer's right eye in use of the system of FIG. 10 but with the viewer's head tilted through +20°. Comparison of FIG. 12 with FIG. 9 showing the corresponding transmission profile for the system of FIG. 5 when the viewer's head is tilted through the same angle indicates a considerable improvement in the insensitivity of the transmission profile to tilting of the viewer's head.

In producing the chromaticity plot of FIG. 11, the optical retardation elements in the system of FIG. 10 were made of birefringent diacrylate polymer RM257 which, because of its ability to undergo photopolymerisation, can be patterned by photolithography and is therefore particularly suitable as a material for the half wave plate 20 of FIG. 10. However, since the quarter wave plate 32 and the half wave plate 25 of the viewing spectacles are unpatterned, it might be preferable for these elements to be made out of more conventional and less costly material utilising stretched retarder films. In practice these elements might be composed of polycarbonate.

Figure 4:
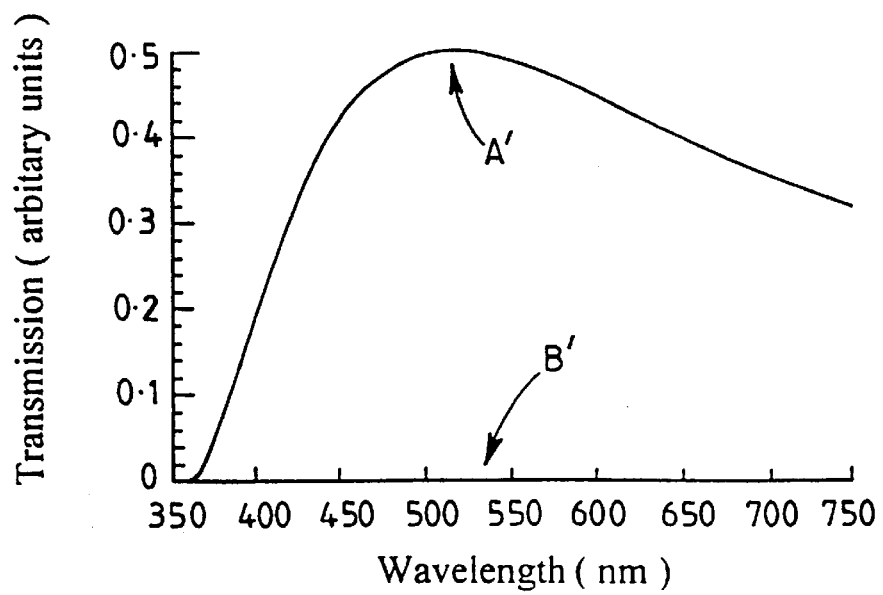
Figure 13:
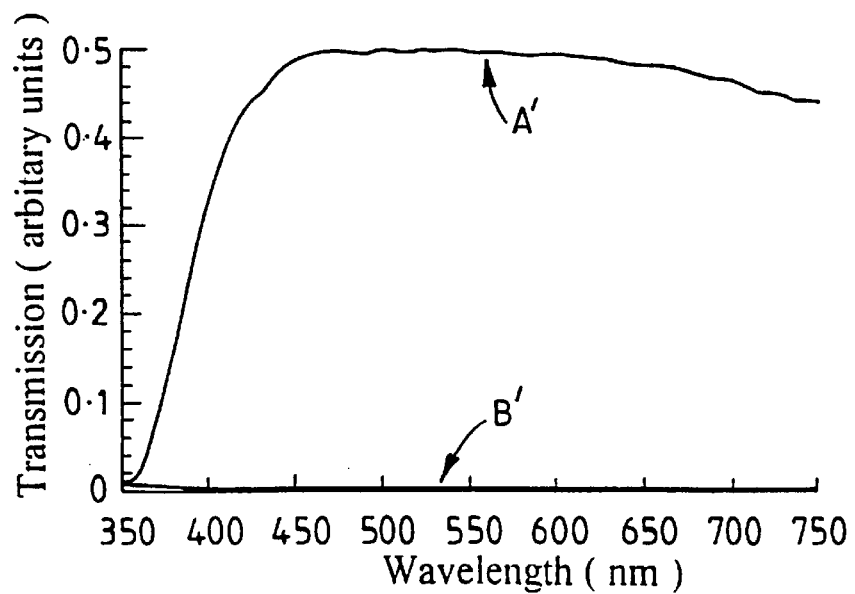

FIG. 13 shows the transmission profile of light received by the viewer's right eye for the system of FIG. 10 but with the quarter wave plate 32 and the half wave plate 25 being made of polycarbonate (but with the half wave plate 20 and the quarter wave plate 30 being made of the polymer RM257 as before). It will be noted that there are slight differences between the transmission profiles of FIGS. 11 and 13. For example the dark state is no longer absolutely achromatic in the wavelength region of about 350 nm in FIG. 13. However the system of FIG. 10 still provides substantially improved achromaticity as compared with the known system of FIG. 1 when the quarter wave plate 32 and the half wave plate 25 are made from polycarbonate. In this regard the transmission profile of FIG. 13 should be compared with the transmission profile of FIG. 4 showing the light received by the viewer's right eye for the known system of FIG. 1 when the quarter wave plate 9 is made from polycarbonate.

Figure 14:
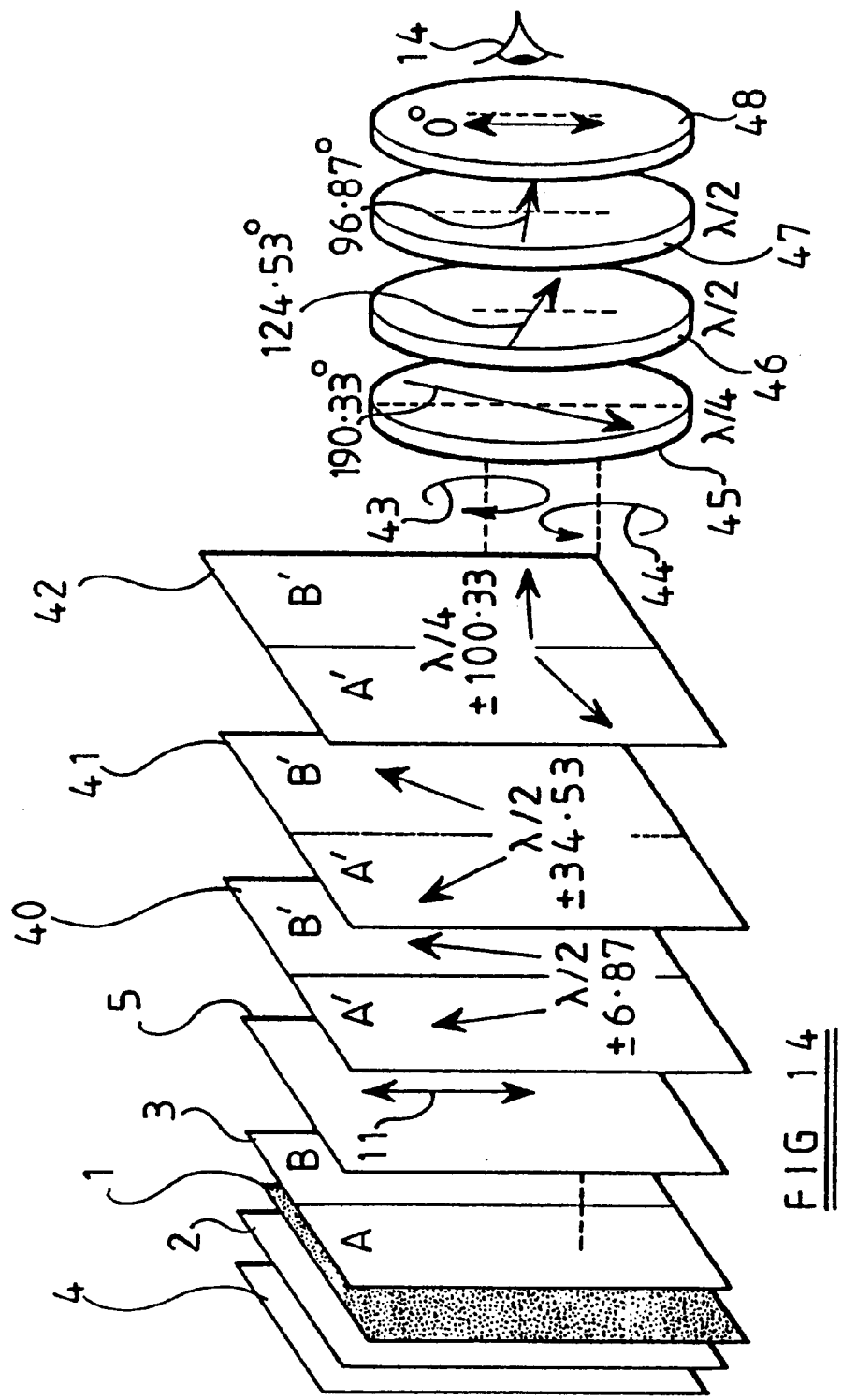
FIGS. 14 and 16 diagrammatically show third and fourth stereoscopic display systems in accordance with the invention.

FIG. 14 shows a third stereoscopic display system in accordance with the invention which utilises more than one patterned optical retardation element to further improve the achromaticity of the system. In this case the display device incorporates three optical retardation elements, namely two half wave plates 40 and 41 and a quarter wave plate 42, having regions A' and B' whose optic axes are oriented at (i) −6.87° and +6.87° in the case of the half wave plate 40, (ii) −34.53° and +34.53° in the case of the half wave plate 41, and (iii) −100.33° and +100.33° in the case of the quarter wave plate 42. As in the system of FIG. 10, circularly polarised light 43 and 44 passes between the display device and the viewing spectacles. Furthermore the viewing spectacles include three optical retardation elements for each eye, namely a quarter wave plate 45 having its optic axis at 190.33°, a half wave plate 46 having its optic axis at 124.53° and a half wave plate 47 having its optic axis at 96.87°, as well as a polariser 48 having its polarisation axis parallel to the polarisation axis 11 of the polariser 5. The three retardation elements 45, 46 and 47 combine to form a circular polariser. The retardation elements associated with the viewer's right eye 14 are shown in FIG. 14, and it will be appreciated that the corresponding retardation elements associated with the viewer's left eye will have their optic axes orientated at corresponding negative angles.

It should be appreciated that the optic axis of the half wave plate 46 associated with the viewer's right eye which is orientated at 124.53° is perpendicular to the optic axis of the region B' of the half wave plate 41 orientated at +34.53° and transverse (that is not parallel) to the optic axis of the region A' of the half wave plate 41 orientated at −34.53°. Furthermore the optic axis of the half wave plate 46 associated with the viewer's left eye orientated at −124.53° is perpendicular to the optic axis of the region A' of the half wave plate 41 and transverse to the optic axis of the region B' of the half wave plate 41.

Figure 15:
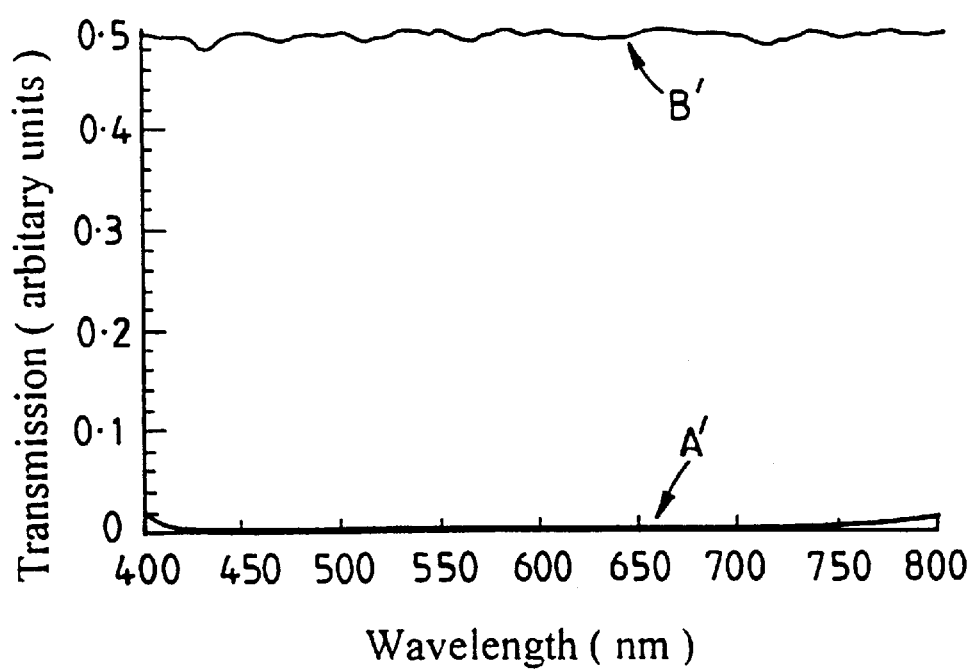
FIGS. 15 and 17 are graphs of the transmission level against wavelength in use of the systems of FIGS. 14 and 16 respectively.

FIG. 15 shows the transmission profile of light received by the viewer's right eye for the system of FIG. 14. The total effect of the retardation elements between the pixel A and the viewer's right eye is to impart substantially zero retardation so as to provide a white appearance between parallel polarisers, whereas the total effect of the retardation elements between the pixel B and the viewer's right eye is to act as a half wave plate so as to provide a black appearance between parallel polarisers, with a much broader bandwidth being provided as compared with the known system of FIG. 1. As with previously described systems, the dark and bright states can be interchanged by rotating the polariser 48 through 90° so that its polarisation axis is crossed with the polarisation axis 11 of the polariser 5.

Figure 16:
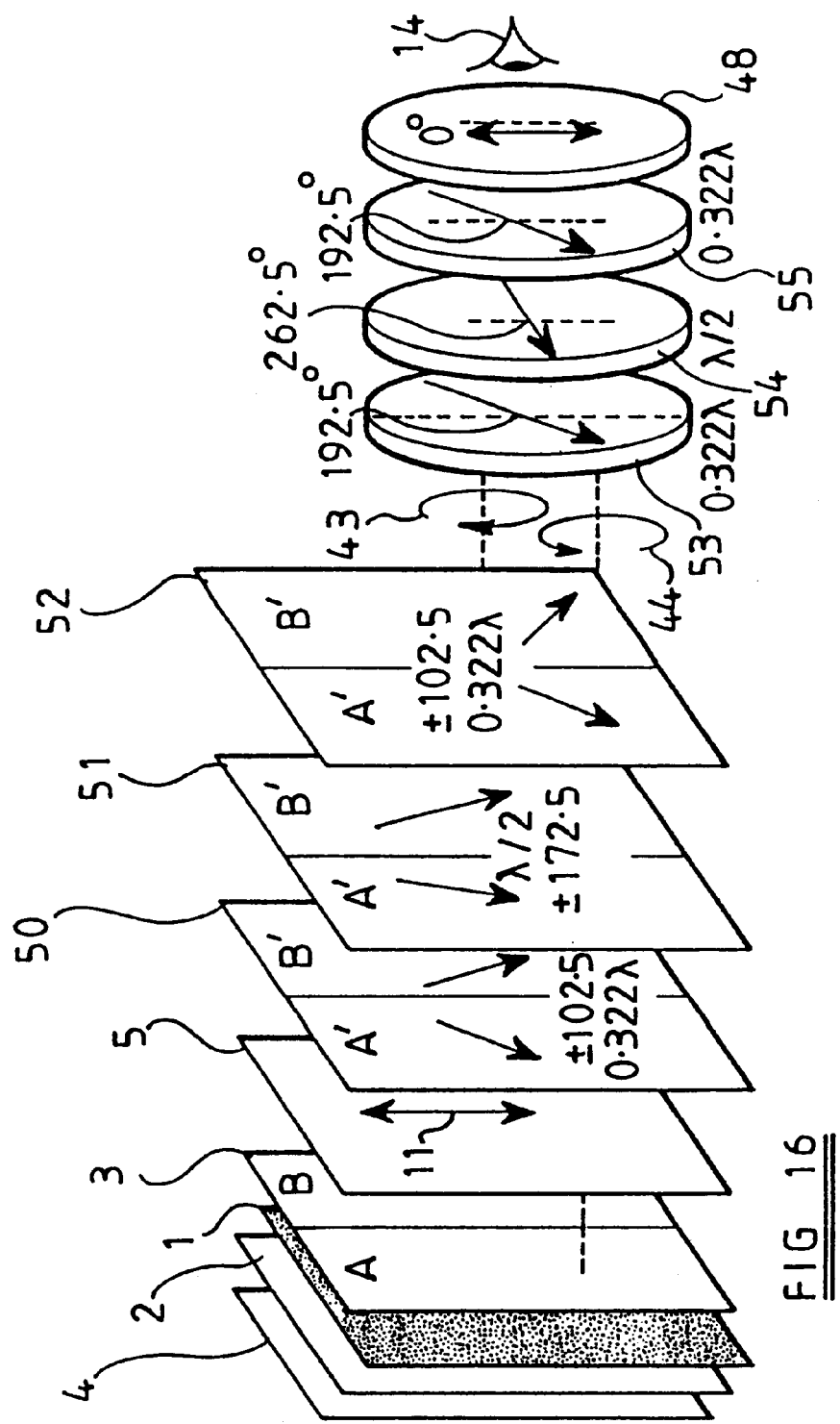
Figure 17:
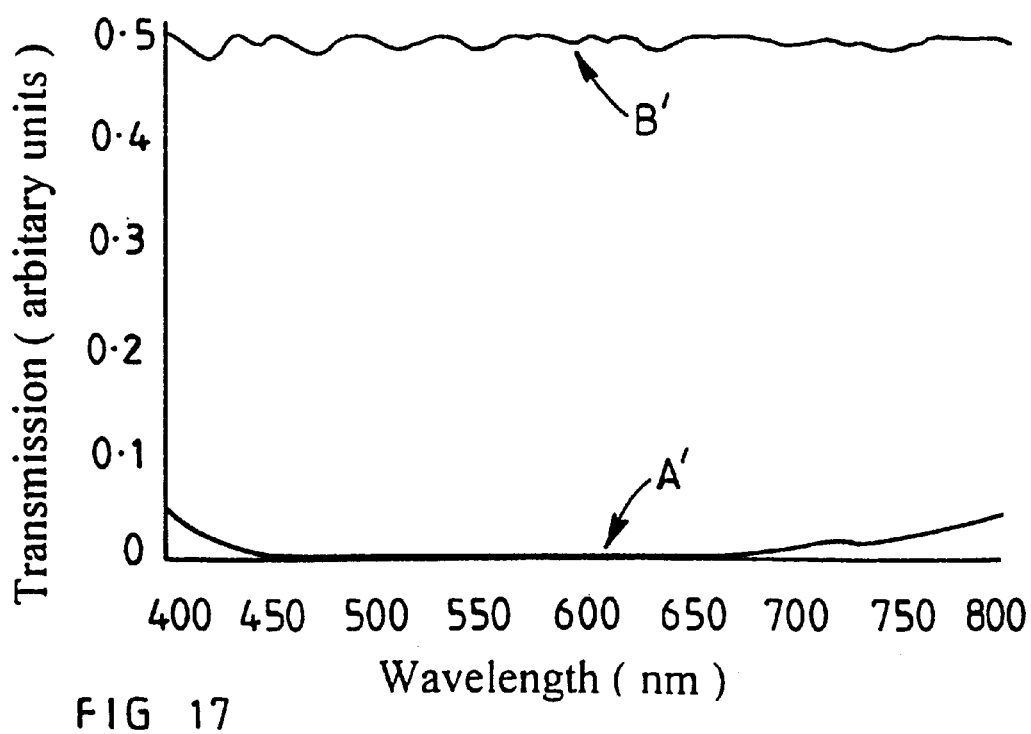

FIG. 16 shows a fourth stereoscopic display system in accordance with the invention having the same number of retardation elements as the system of FIG. 14. However, in the system of FIG. 16, the retardation elements comprise a 0.322 λ retarder 50 having an optic axis at −102.5° in the region A' and an optic axis at +102.5° in the region B', a half wave plate 51 having an optic axis at −172.5° in the region A' and an optic axis at +172.5° in the region B', and a 0.322 λ retarder 52 having an optic axis at −102.5° in the region A' and an optic axis at +102.5° in the region B'. Furthermore the retardation elements for each eye of the viewing spectacles comprise a 0.322 λ retarder 53 having an optic axis at ±192.5°, a half wave plate 54 having an optic access at ±262.5°, and a 0.322 λ retarder 55 having an optic axis at ±192.5°. The three retardation elements 50, 51 and 52 combine to form a first quarter wave retarder having a unique optic axis for each region A' to B', and the three retardation elements 53, 54 and 55 for each eye combine to form a second quarter wave retarder having an optic axis perpendicular to one of the optic axes of the first quarter wave retarder and transverse to the other optic axis of the first quarter wave retarder. FIG. 17 shows the transmission profile of the light received by the viewer's right eye for the system of FIG. 16, and it will be appreciated that similar performance is achieved with such a system as with the system of FIG. 14.

Figure 18:
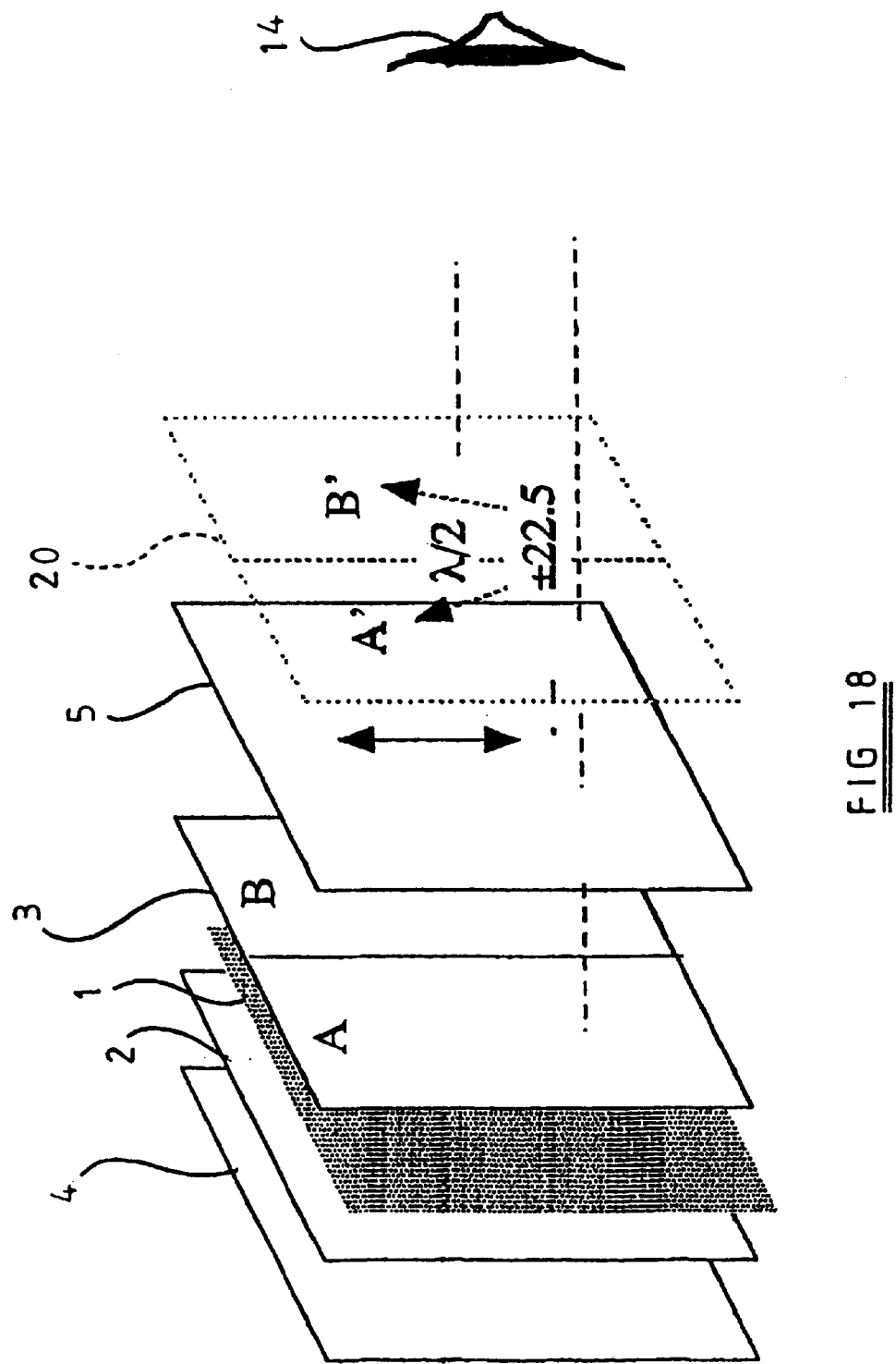
FIG. 18 diagrammatically shows the first display system when used to display a 2D image.

In a development of the invention the liquid crystal display panel is controllable between two modes, that is a stereoscopic image display mode and a conventional 2D (non-stereoscopic) image display mode, and a user-operable switch is provide to enable the user to switch the system between these two modes. In the conventional 2D image display mode, the liquid crystal display panel is driven by conventional 2D data signals such as are used to display 2D images in known 2D display systems. Since the human eye is intensive to the polarisation state of the light, the viewer can observe the 2D image simply by removing the viewing device (comprising the components 25 and 27 in FIG. 5) from before the eyes. This is illustrated in FIG. 18 which shows the components 25 and 27 removed in the embodiment of FIG. 5. In this case the viewer becomes substantially unaware of the patterned retarder 20 because the retarder 20 substantially only affects the polarisation state of the light. Thus, provided that the appropriate 2D image data is supplied to the pixels of the display panel in place of the 3D image data otherwise supplied, the panel can operate as a conventional 2D display panel which is viewed by the user without the aid of the viewing device.

What is claimed is:

1. An imaging system comprising:
   a matrix of light modulating elements including first elements for transmitting a first image component and second elements for transmitting a second image component, comprising a liquid crystal optical shutter disposed between a pair of electrodes;
   a polarising element having a first polarisation axis for linearly polarising light from the first and second elements;
   a first optical retardation element in optical series with the polarising element and incorporating at least one first retarder having first regions having a first optic axis at a first orientation to the first polarisation axis and second regions having a second optic axis at a second orientation to the first polarisation axis, whereby light from the first element is resultantly polarised by the polarising element and the first regions and light from the second elements is resultantly polarised by the polarising element and the second regions orthogonally to the light resultant polarised by the first regions; and
   a detecting element having first and second detecting parts, each of the first and second detecting parts including a respective second optical retardation element incorporating at least one second retarder and an analysing element having a second polarisation axis intended to be disposed at a defined orientation relative to the first polarisation axis, at least one second retarder of the first detecting part having an optic axis which is intended to be disposed substantially perpendicularly to the first optic axis and non-parallel and non-perpendicular to the second optic axis of the at least one first retarder, and at least one second retarder of the second detecting part having an optic axis which is intended to be disposed substantially perpendicularly to the second optic axis and non-parallel and non-perpendicular to the first optic axis of the at least one first retarder, whereby substantially only light relating to the first image component is transmitted by the first detecting part and substantially only light relating to the second image component is transmitted by the second detecting part.

2. A system according to claim 1, wherein the first optical retardation element is adapted to linearly polarising light from the first elements in a first direction and to linearly polarising light from the second element in a second direction transverse to the first direction.

3. A system according to claim 1, wherein the at least one first retarder comprise a half wave plate incorporating first and second regions having optic axes which are orientated at equal but opposite angles to the first polarisation axis.

4. A system according to claim 3, wherein the optic axes of the first and second regions of the half wave plate are orientated at about −22.5° and about 22.5° to the first polarization axis.

5. A system according to claim 1, wherein the at least one second retarder comprises a half wave plate, the two half wave plates of the first and second detecting parts having optic axes which are orientated at equal but opposite angles to the first polarisation axis.

6. A system according to claim 5, wherein the optic axes of the half wave plates of the first and second detecting parts are orientated at about −67.5° and about +67.5° to the first polarisation axis.

7. A system according to claim 1, in which the detecting element is tiltable relative to the first optical retardation element, further comprising a third optical retardation element for circularly polarising the light from the first and second regions of the first optical retardation element and a respective fourth optical retardation element associated with each of the detecting parts for linearly polarising the circularly polarised light from the third optical retardation element for inputting to the second optical retardation element of the detecting part.

8. A system according to claim 7, wherein the third optical retardation element comprises a quarter wave plate having an optic axis orientated at about 90° to the first polarisation axis.

9. A system according to claim 7, wherein the respective fourth optical retardation element of each of the detecting parts comprises a quarter wave plate having an optic axis which is substantially parallel to the first polarisation axis.

10. A system according to claim 7, wherein the third optical retardation element comprises a quarter wave plate incorporating first regions having an optic axis at a first orientation to the first polarisation axis and second regions having an optic axis at a second orientation to the first polarisation axis such that light from the first elements is circularly polarised in one direction and light from the second elements in circularly polarised in the opposite direction.

11. A system according to claim 1, wherein the first optical retardation element includes two half wave plates disposed in series and each incorporating first and second regions having optic axes which are oriented at equal but opposite angles to the first polarisation axis.

12. A system according to claim 1, wherein the second optical retardation element includes two half wave plates disposed in series and each incorporating first and second regions having optic axis which are orientated at equal but opposite angles to the first polarisation axis.

13. A system according to claim 1, being a stereoscopic imaging system, wherein the first and second detecting parts of the detecting elements are constituted by left eye and right eye viewing parts by means of which a viewer may view a stereoscopic image by observing the first and second image components with the left and right eyes simultaneously.

14. A system according to claim 13, wherein the matrix of modulating elements, the polarising element and the first optical retardation element constitute a display device, and the detecting element constitutes spectacles to be worn by the viewer with the right eye and left eye viewing parts in front of the viewer's right and left eyes.

15. A system according to claim 13, wherein switchable control elements are provided for controlling the light modulating elements to transmit the first and second image components in a stereoscopic imaging mode and a 2D image which is viewable without the detecting element in a non-stereoscopic image mode.

16. A detection system for detecting polarised light from a liquid crystal optical shutter disposed between a pair of electrodes polarised by a first retarder having a first optic axis at a first orientation and polarised light, orthogonal to the light polarised by the first retarder, polarised by a second retarder having a second optic axis at a second orientation, the detection system comprising:

first and second detecting parts each of which includes a respective optical retardation element incorporating at least one third retarder and an associated analysing element;

the at least one third retarder of the first detecting part having an optic axis which is intended to be disposed substantially perpendicularly to the first optic axis and non-parallel and non-perpendicular to the second optic axis; and the at least one third retarder of the second detecting part having an optic axis which is intended to be disposed substantially perpendicularly to the second optic axis and non-parallel and non-perpendicular to the first optic axis, whereby substantially only light representative of a first image component is transmitted by the first detecting part and substantially only light representative of a second image component is transmitted by the second detecting part.

17. A system according to claim 16, wherein the at least one third-retarder comprises a half wave plate, the two half wave plates of the first and second detecting parts having optic axes which are orientated at equal but opposite angles to a reference axis.

18. A system according to claim 17, wherein the optic axes of the half wave plates of the first and second detecting parts are orientated at about −67.5° and about +67.5° to the reference axis.

19. A method of obtaining a stereoscopic image by combining a matrix of light modulating elements with a detecting element having first and second detecting parts, wherein the matrix of light modulating elements comprises a liquid crystal optical shutter disposed between a pair of electrodes and includes first elements which transmit a first image component and second elements which transmit a second image component, there being associated with the matrix a polarising element having a first polarisation axis which linearly polarises light from the first and second elements, and a first optical retardation element in optical series with the polarizing element and incorporating at least one first retarder having first regions having a first optic axis at a first orientation to the first polarisation axis and second regions having a second optic axis at a second orientation to the first polarisation axis, whereby light from the first elements is resultantly polarised by the polarising element and the first regions and light from the second elements is resultantly polarised by the polarising element and the second regions orthogonally to the light resultantly polarised by the first regions; and each of the first and second detecting parts of the detecting element includes a respective second optical retardation element incorporating at least one second retarder and an analysing element having a second polarisation axis at a defined orientation relative to the first polarisation axis, at least one second retarder of the first detecting part having an optic axis which is substantially perpendicular to the first optic axis and non-parallel and non-perpendicular to the second optic axis of the at least one first retarder, and at least one second retarder of the second detecting part having an optic axis which is substantially perpendicular to the second optic axis and non-parallel and non-perpendicular to the first optic axis of the at least one first retarder, whereby substantially only light relating to the first image component is transmitted by the first detecting part and substantially only light relating to the second image component is transmitted by the second detecting part.

\* \* \* \* \*